(12) United States Patent
Ni et al.

(10) Patent No.: US 9,726,502 B2
(45) Date of Patent: Aug. 8, 2017

(54) ROUTE PLANNER FOR TRANSPORTATION SYSTEMS

(71) Applicant: SAP SE, Walldorf (DE)

(72) Inventors: Peng Ni, Singapore (SG); Hoang Tam Vo, Singapore (SG); Daniel Hermann Richard Dahlmeier, Singapore (SG); Wentong Cai, Singapore (SG)

(73) Assignee: SAP SE, Walldorf (DE)

( * ) Notice: Subject to any disclaimer, the term of this patent is extended or adjusted under 35 U.S.C. 154(b) by 156 days.

(21) Appl. No.: 14/840,064

(22) Filed: Aug. 31, 2015

(65) Prior Publication Data

US 2017/0059331 A1    Mar. 2, 2017

(51) Int. Cl.
*G01C 21/20* (2006.01)
*G01C 21/34* (2006.01)
*G08G 1/01* (2006.01)

(52) U.S. Cl.
CPC ........ *G01C 21/20* (2013.01); *G01C 21/3446* (2013.01); *G01C 21/3453* (2013.01); *G08G 1/0125* (2013.01)

(58) Field of Classification Search
CPC  G01C 21/20; G01C 21/3446; G01C 21/3453; G08G 1/0125
See application file for complete search history.

(56) References Cited

U.S. PATENT DOCUMENTS

| | | | |
|---|---|---|---|
| 8,121,749 B1* | 2/2012 | Agrawal | G06Q 10/047 701/23 |
| 2013/0173152 A1* | 7/2013 | Schilling | H03M 7/40 701/527 |
| 2015/0051944 A1* | 2/2015 | Shekhar | G06Q 10/06316 705/7.26 |
| 2015/0134850 A1* | 5/2015 | Rolf | G01C 21/32 709/241 |

OTHER PUBLICATIONS

E. W. Dijkstra, A Note on Two Problems in Connexion with Graphs, Numerische Mathematik 1, 1959, pp. 269-271, Springer-Verlag.
(Continued)

*Primary Examiner* — Richard Camby
(74) *Attorney, Agent, or Firm* — Horizon IP Pte Ltd.

(57) ABSTRACT

A computer-implemented technology for planning routes is described herein. In accordance with one aspect, travel data of commuters of a transportation network are provided. Continuous distributions of travel time and waiting time are generated from the travel data. The continuous distributions of travel time and waiting time are associated to a transportation graph of the transportation network. The transportation graph includes nodes corresponding to stops of the transportation network and edges interconnecting the nodes. Travel time and waiting time are associated as costs of the edges in the transportation graph. In response to receiving input parameters, expected costs of candidate routes in the transportation graph are determined in accordance with a modified multi criteria shortest path technique. The modified multi criteria shortest path technique invokes a subroutine to (Continued)

retrieve accurate costs of routes based at least on the costs of the edges in the transportation graph. Route recommendations are provided based on the expected costs of the candidate routes.

20 Claims, 13 Drawing Sheets

(56) References Cited

OTHER PUBLICATIONS

Vedat Akgun et al., On Finding Dissimilar Paths, European Journal of Operational Research, 2000, pp. 232-246, Elsevier Science B.V.
Hannah Bast et al., Fast Routing in Very Large Public Transportation Networks using Transfer Patterns, Annual European Conference on Algorithms, 2010, pp. 290-301, Springer-Verlag Berlin.
Hannah Bast et al., Route Planning in Transportation Networks, Technical Report, MSR-TR-2014-4, 2014.
Reinhard Bauer et al., SHARC: Fast and Robust Unidirectional Routing, Journal of Experimental Algorithmics, Jan. 2010, ACM, USA.
Reinhard Bauer et al., Experimental Study on Speed-Up Techniques for Timetable Information Systems, 7th Workshop on Algorithmic Approaches for Transportation Modeling, Optimization, and Systems, 2007, pp. 209-225, ATMOS.
Wojciech Chmiel et al., A Multicriteria Model for Dynamic Route Planning, Multimedia Communications, Services and Security, 2011, vol. 149, Poland.
Joao C.N. Climaco et al., Finding Non-Dominated Bicriteria Shortest Pairs of Disjoint Simple Paths, Computers & Operations Research, 2009, vol. 36, Issue 11, Elsevier Ltd., UK.
Daniel Delling et al., Computing Multimodal Journeys in Practice, Experimental Algorithms, 2013, pp. 260-271, vol. 7933, Springer Berlin Heidelberg.
Paolo Dell'Olmo et al., On Finding Dissimilar Pareto-Optimal Paths, European Journal of Operational Research, Apr. 2005, pp. 70-82, vol. 162, Issue 1, Elsevier B.V.
Yann Disser et al., Multi-criteria Shortest Paths in Time-Dependent Train Networks, Experimental Algorithms, 2008, pp. 347-361, vol. 5038, Springer Berlin Heidelberg.
David Eppstein, Finding the k Shortest Paths, Mar. 31, SIAM Journal on Computing, Apr. 1999, vol. 28, Issue 2, USA.
Wen Jin et al., Finding the K Shortest Paths in a Time-Schedule Network with Constraints on Arcs, Computers & Operations Research, Dec. 2013, pp. 2975-2982, vol. 40, Issue 12, Elsevier Ltd.
Rafael Marti et al., Heuristics for the Bi-Objective Path Dissimilarity Problem, Computers & Operations Research, vol. 36, Issue 11, Jan. 2009, Elsevier Ltd.
Matthias Mueller-Hannemann et al., Finding All Attractive Train Connections by Multi-criteria Pareto Search, Algorithmic Methods for Railway Optimization, 2007, pp. 246-263, vol. 4359, Springer-Verlag Berlin Heidelberg.
Evangelia Pyrga et al., Efficient Models for Timetable Information in Public Transportation Systems, Journal of Experimental Algorithmics (JEA), Jun. 2008, vol. 12, Article No. 2.4, ACM.
Wangtu Xu et al., Finding the K Shortest Paths in a Schedule-Based Transit Network, Computers & Operations Research, Aug. 2012, pp. 1812-1826, vol. 39, Issue 8, Elsevier Ltd.
Jin Y. Yen et al., Finding the K Shortest Loopless Paths in a Network, Management Science, Theory Series, Jul. 1971, pp. 712-716, vol. 17, No. 11, Informs.
Verband Deutscher Verkehrsunternehmen (VDV), VDV Schriften, VDV Standard Interface Network/Timetable, http://mitglieder.vdv.de/module/layout_upload/452_sesv14.pdf, Accessed on Dec. 5, 2015, Association of German Transport.
Hannah Bast et al., Route Planning in Transportation Networks, Technical Report MSR-TR-2014-4, Jan. 8, 2014, pp. 1-56, Microsoft Research Microsoft Corporation, Redmond, WA.
Justin Boyan and Michael Mitzenmacher, Improved Results for Route Planning in Stochastic Transportation Networks, ACM—SIAM Symposium on Discrete Algorithms (SODA), 2001, pp. 895-902, Cambridge, MA.
Russel E. Caflisch, Monte Carlo and Quasi-Monte Carlo Methods, Acta Numerica, 1998, pp. 1-49, 7, Cambridge University Press, Los Angeles, CA.
Bi Yu Chen et al., Finding Reliable Shortest Paths in Road Networks Under Uncertainty, Networks and Spatial Economics, Jun. 2013, pp. 123-148, 13-2, Springer US, U.S.A.
Mayur Datar and Abhiram Ranade, Commuting with Delay Prone Buses, ACM—SIAM Symposium on Discrete Algorithms (SODA), Feb. 1, 2000, pp. 22-29, Society for Industrial and Applied Mathematics, Philadelphia, PA.
Yann Disser et al., Multi-Criteria Shortest Paths in Time-Dependent Train Networks, Experimental Algorithms, 2008, pp. 347-361, Springer-Verlag Berlin/Heidelberg, Berlin, Heidelberg.
Daniel Dufresne, Sums of Lognormals, Actuarial Research Conference, 2008, pp. 1-6, Centre for Actuarial Studies, University of Melbourne, Melbourne.
Song Gao, Optimal Adaptive Routing and Traffic Assignment in Stochastic Time-Dependent Networks, PhD Thesis, 2005, pp. 1-237, Massachusetts Institute of Technology, Massachusetts.
Song Gao and Ismail Chabini, Optimal Routing Policy Problems in Stochastic Time-Dependent Networks, Transportation Research Part B: Methodological, Feb. 2006, pp. 93-122, 40-2, Elsevier Ltd.
Song Gao et al., Adaptive Route Choices in Risky Traffic Networks: A Prospect Theory Approach, Transportation Research Part C: Emerging Technologies, Oct. 2010, pp. 727-740, 18-5, Elsevier Ltd.
Randolph W. Hall, The Fastest Path Through a Network with Random Time-Dependent Travel Times, Transportation Science, Aug. 1986, pp. 182-188, 20-3, INFORMS, Hanover, MD.
Jordan Ivanchev et al., Stochastic Bus Traffic Modelling and Validation Using Smart Card Fare Collection Data, Intelligent Transportation Systems (ITSC), Oct. 8-11, 2014, pp. 2054-2061, 2014 IEEE 17th International Conference on Intelligent Transportation Systems (ITSC), Qingdao.
Der-Horng Lee et al., Study of Bus Service Reliability in Singapore Using Fare Card Data, 12th Asia-Pacific Intelligent Transportation Forum, Jan. 2012, pp. 1-10, Research Gate, Singapore.
Sejoon Lim et al., Stochastic Motion Planning and Applications to Traffic, Algorithmic Foundation of Robotics VIII, 2009, pp. 483-500, 57, Springer Berlin/Heidelberg, Berlin, Heidelberg.
Sejoon Lim et al., Practical Route Planning Under Delay Uncertainty: Stochastic Shortest Path Queries, Robotics: Science and Systems, Jul. 5, 2013, pp. 249, 8-32, The MIT Press, Cambridge, MA.
Ronald Prescott Loui, Optimal Paths in Graphs with Stochastic or Multidimensional Weights, Communications of the ACM, Sep. 1983, pp. 670-676, 26-9, ACM, New York, U.S.A.
Gopinath Menon et al., Lessons from Bus Operations, a Report Collected from web http://www.ptc.gov.sg/_files/LessonsfromBusOperationsREV5.pdf, Mar. 2006, pp. 1-25, Singapore.
Elise D. Miller-Hooks and Hani S. Mahmassani, Least Expected Time Paths in Stochastic, Time-Varying Transportation Networks, Transportation Science, May 1, 2000, pp. 198-215, 34-2, INFORMS, Catonsville, MD.
Evdokia Nikolova, Approximation Algorithms for Reliable Stochastic Combinatorial Optimization, Approximation, Randomization, and Combinatorial Optimization. Algorithms and Techniques, Sep. 17, 2010. pp. 338-351, Massachusetts Institute of Technology, Massachusetts.
Evdokia Nikolova et al., Optimal Route Planning under Uncertainty, International Conference on Automated Planning and Scheduling (ICAPS), Jun. 2006, pp. 131-141, 6, Mitsubishi Electric Research Laboratories, Inc., Cambridge, MA.
Evdokia Nikolova et al., Stochastic Shortest Paths via Quasi-Convex Maximization, European Symposium on Algorithms (ESA) Proceedings of the 14th Conference on Annual European Symposium, 2006, pp. 552-563, 14, Springer-Verlag London, United Kingdom.

(56) References Cited

OTHER PUBLICATIONS

E. E. Osuna and G. F. Newell, Control Strategies for an Idealized Public Transportation System, Transportation Science, Feb. 1, 1972, pp. 52-72, 6-1, INFORMS, Catonsville, MD.

Jin Park et al., Use of Smart Card Data to Define Public Transit Use in Seoul, South Korea, Transportation Research Record: Journal of the Transportation Research Board, 2008, pp. 3-9, 2063-1, Transportation Research Board of the National Academies, Washington D.C.

Evangelia Pyrga et al., Efficient Models for Timetable Information in Public Transportation Systems, Journal of Experimental Algorithms (JEA), 2008, pp. 2-4, 12, ACM, New York, U.S.A.

Shichao Sun et al., How to Find the Optimal Paths in Stochastic Time-Dependent Transportation Networks?, Intelligent Transportation Systems (ITSC), Oct. 8-11, 2014, pp. 2348-2353, 2014 IEEE 17th International Conference on Intelligent Transportation Systems (ITSC), Qingdao.

Chengjin Wu et al., Adaptive Route Guidance Based on Real-Time Information in Stochastic Time-Dependent Transportation Networks, Intelligent Transportation Systems (ITSC), Oct. 8-11, 2014, pp. 2392-2397, 2014 IEEE 17th International Conference on Intelligent Transportation Systems (ITSC), Qingdao.

Xing Wu and Yu (Marco) Nie, Modeling Heterogeneous Risk-Taking Behavior in Route Choice: A Stochastic Dominance Approach, Transportation Research Part A: Policy and Practice, Nov. 2011, pp. 896-915, 45-9, Elsevier Ltd.

\* cited by examiner

Algorithm 1: Compute linearized travel time

Input: Departure time $t$

Output: Expected bus travel time $T$

/* check if the departure time is within bus operating time */

1    if $t < t_0$ or $t > t_0 + R * R_l$ then
2        return $T = \infty$
3    end

/* first get the index of the best matching interval $i_s$ */

4    $i_s = (t - t_0)$ mod $R_l$

/* next find the index of the upper and lower bounding intervals $i_u$ and $i_l$ */

5    if $t < p_0$ or $t > p_{R-1}$ then
        // t falls in the first/last interval
6        $i_u = i_l = i_s$
7    else if $t < p_{i_s}$ then
        // $2^{nd}$ best matching is on the left
8        $i_u = i_s$
9        $i_l = i_s - 1$
10   else
        // $2^{nd}$ best matching is on the right
11       $i_u = i_s + 1$
12       $i_l = i_s$
13  end
14  return $T = T^{i_l} + (t - p_{i_l}) / R_l * (T^{i_u} - T^{i_l})$ where $t_0$ : the starting time of the first interval of a day $i_j$ : time interval, $i_j = \{t \mid t \in (t_0 + j * R_l, t_0 + (j + 1) * R_l\}$ $p_j$: the middle point of the time interval $i_j$, $p_j = t_0 + (j + 0.5) * R_l$ $T^j$ : the travel time for a bus in time interval $j$

*Fig. 5*

Algorithm 2: Modified multi-criteria shortest path

Input: graph $g$, source node $n_s$, destination node $n_d$, departure time $t$

Output: shortest paths and expected costs

/* initialization                                          */

1   priorityQueue $pq = \emptyset$
2   predecessorMap $pm = \emptyset$
3   nodeCostsList $cl = \emptyset$
4   label $l_s$ = createLabel($n_s$, $c_s = 0$)
5   $pq$.insert($l_s$)
6   while !$pq = \emptyset$ do
7       label $l_u = pq$.pop()
8       node $n_u = l_u$.getNode()
9       foreach *outgoing edge* $e_{u,v}$ do
10          cost $c_v$ = getAccurateCost($l_u$, $e_{u,v}$, $t$)
11          List<cost> $costs = cl$.getCosts($n_v$)
12          if $c_v$ *is dominated by costs* then
                /* drop $c_v$ since it is not smaller than any of existing costs   */
13              continue
14          end
            /* $c_v$ is not dominated                       */
15          $cl$.put ($n_v$, $c_v$)
16          $cl$.removeDominated()
17          label $l_v$ = createLabel($n_v$, $c_v$)
18          $pm$.put($l_v$, $l_u$)
19          $pq$.insert($l_v$)
20      end
21  end

*Fig. 8*

Algorithm 3: getAccurateCost

Input: label $l_u$, edge $e_{u,v}$, departure time $t$ at source
Output: cost $c_v$ 1    cost $c_u = l_u.getCost()$
2    node $n_u = l_u.getNode()$
3    if $n_u$ is a transfer node and $n_v$ is not then
       /* a boarding process                                  */
4        cost $c_w = e_{u,v}.getWaitingTime(t + c_u.mean)$
5        $c_v = c_u + c_w$
6    else if $n_v$ is a transfer node and $n_u$ is not then
       /* an alighting process                                  */
7        $c_v = c_u$
8    else
9        label $l_w$
       /* trace back to find the last
       non-transfer node $n_w$.                                  */
10       label $l_i = l_u$
11       while $n_i = l_i.getNode()$ is not a transfer node do
12           $l_w = l_i$
13           label $l_i = pm.getPredecessor(l_i)$
14       end
15       cost $c_w = l_w.getCost()$
16       $c_v = c_w + e_{w,v}.getTravelTime(t + c_w.mean)$
17    end
18    return $c_v$

*Fig. 9*

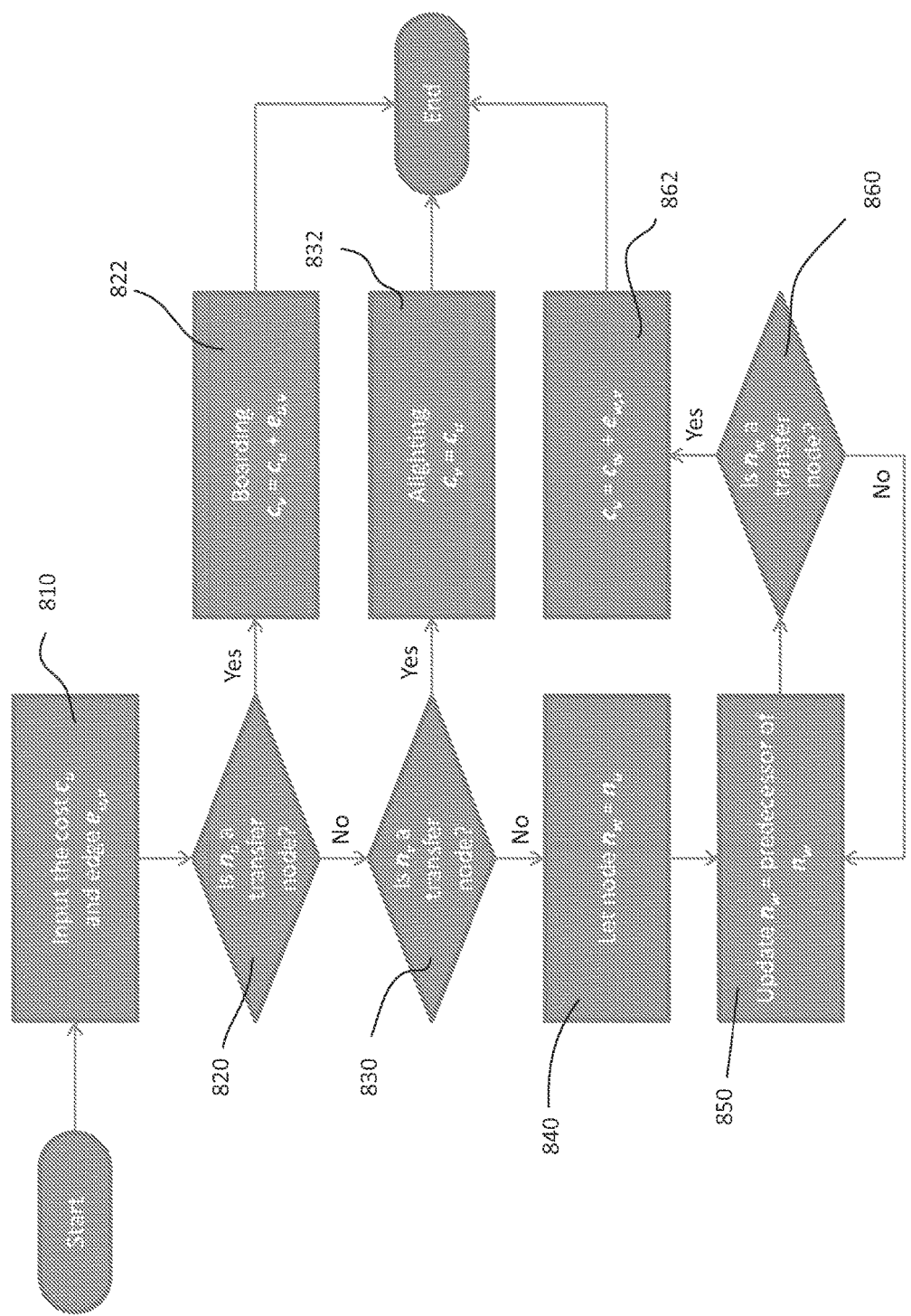

ROUTE PLANNER FOR TRANSPORTATION SYSTEMS

CROSS-REFERENCE TO RELATED APPLICATIONS

This application cross-references to U.S. patent application Ser. No. 14/840,069, titled "DIVERSIFIED ROUTE PLANNING FOR PUBLIC TRANSPORTATION NETWORK" that is concurrently filed and assigned to the same assignee as this application, which is herein incorporated by reference for all purposes.

TECHNICAL FIELD

The present disclosure relates to computer systems, and more specifically, to a system for planning transportation routes based on a stochastic time-dependent framework.

BACKGROUND

Intelligent urban transportation systems are becoming increasingly important for commuters in cities. Such systems, for example, enable city-dwellers to quickly identify an optimal route in a transit network between a specified origin and destination when planning trips. In many aspects, route planning is an important part of intelligent transportation systems.

Traditional route planners of public transportation such as buses follow a fixed or static schedule. However, in a realistic transit network, buses' arrival times are not as accurate as scheduled since they are largely dependent on real-time traffic situations. In fact, the travel time in an urban traffic environment is highly stochastic and time-dependent. Hence, the results returned by static route planners are often inadequate in real world and cause user dissatisfaction.

Additionally, existing route planners have several drawbacks. First, the query result is the same no matter whether the departure time falls in peak or off-peak periods. Next, the travel time estimated by the route planners is not accurate. For example, Google Maps returns a travel time of about 30 minutes for a journey consisting of 30 bus stops. In practice, the journey takes longer, for example, at least 50 minutes due to various traffic conditions at each stop.

SUMMARY

A computer-implemented technology for planning routes is described herein. In accordance with one aspect, travel data of commuters of a transportation network are provided. Continuous distributions of travel time and waiting time are generated from the travel data. The continuous distributions of travel time and waiting time are associated to a transportation graph of the transportation network. The transportation graph includes nodes corresponding to stops of the transportation network and edges interconnecting the nodes. Travel time and waiting time are associated as costs of the edges in the transportation graph. In response to receiving input parameters, expected costs of candidate routes in the transportation graph are determined in accordance with a modified multi criteria shortest path technique. The modified multi criteria shortest path technique invokes a subroutine to retrieve accurate costs of routes based at least on the costs of the edges in the transportation graph. Route recommendations are provided based on the expected costs of the candidate routes.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 5 shows an exemplary pseudo code of a linearization technique to linearize the travel time step functions of the time intervals in a day;

FIG. 8 illustrates an exemplary pseudo code of the modified multi-criteria shortest path technique;

FIG. 9 shows an exemplary subroutine to retrieve accurate costs between nodes;

FIG. 10 shows an exemplary process for obtaining accurate cost;

DETAILED DESCRIPTION

Figure 1:
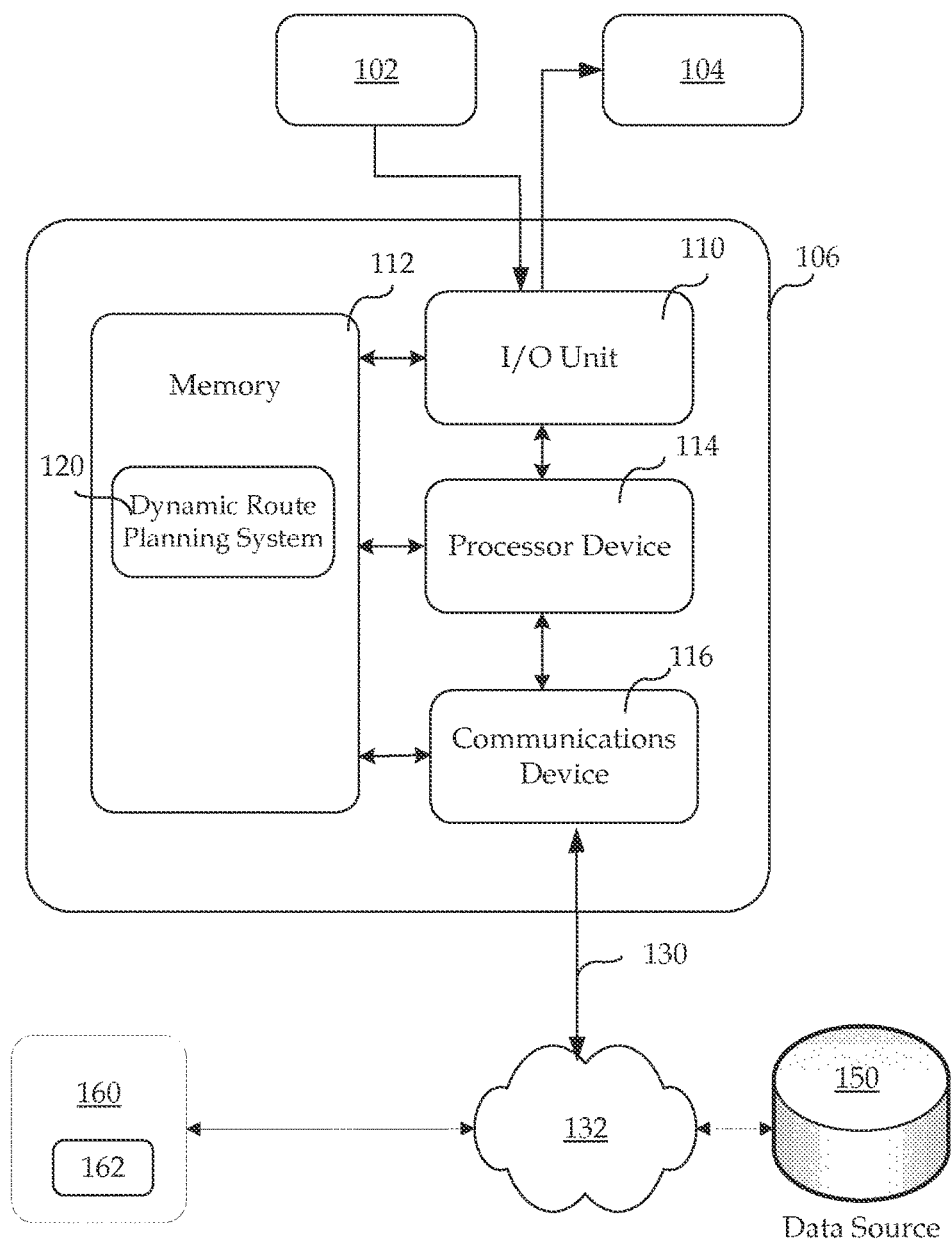
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for a dynamic route planning system which recommends optimal route in a stochastic time-dependent transit network is provided. The transit network, in one implementation, may be a time-dependent public transportation network such as, for example, a public bus network. In accordance with one aspect, the framework provides a stochastic time-dependent model for public transit networks based on collected travel smart card data. Both travel time and waiting time distributions are generated based on information extracted from the smart card data. The framework incorporates a first-in-first-out (FIFO) property in the time-dependent models by modeling the travel time and waiting time distributions as a time-dependent continuous distribution functions. The FIFO property may be a condition, for example, in the case of a bus transportation system, where buses do not overtake each other. This ensures that a bus which leaves a first stop arrives at second stop earlier relative to another bus which leaves the first stop later. Accordingly, a commuter who gets on an earlier bus is assumed to arrive earlier.

Next, the framework addresses component aggregation property of travel time. For example, the travel time between two bus stops is not equal to the sum of travel times of each pair of consecutive stops between the two bus stops. This may be due to additional time taken, for instance, for passengers boarding and alighting at consecutive intermediate stops in between the two bus stops. As a bus travels further and stops at more stations along a trip, the aggregate error in travel time estimation increases. The framework applies a modified or adapted algorithm that deals with the aggregated error of travel time. Additionally, a time-dependent transportation graph is employed with the modified algorithm to optimize route recommendations to users.

Further, the framework incorporates the reliability of the recommended routes as part of the output in addition to the expected travel time (or speediness). This advantageously enables the recommendation of routes that are adapted to traffic situations. The framework allows for uncertain and time-dependent characteristics of traffic to be taken into consideration in providing recommendation of routes. These and various other features and advantages will be apparent from the following description.

The framework described herein may be implemented as a method, computer-controlled apparatus, a computer process, a computing system, or as an article of manufacture such as a computer-usable medium.

FIG. 1 shows a block diagram illustrating an exemplary system 100 that may be used to implement the framework described herein. System 100 includes a computer system 106 communicatively coupled to an input device 102 (e.g., keyboard, touchpad, microphone, camera, etc.) and an output device 104 (e.g., display device, monitor, printer, speaker, etc.). Computer system 106 may include a communications device 116 (e.g., a modem, wireless network adapter, etc.) for exchanging data with a network 132 using a communications link 130 (e.g., telephone line, wireless or wired network link, cable network link, etc.). The network may be a local area network (LAN) or a wide area network (WAN). The computer system 106 may be communicatively coupled to one or more client devices 160 via the network. For example, the computer system 106 may act as a server and operate in a networked environment using logical connections to one or more client devices 160.

Client devices 160 may include components similar to the computer system 106, and may be in the form of a mobile device, tablet computer, communication device, desktop computer, browser-based device, etc. A user at the client device 160 may interact with a user interface component 162 to communicate with the computer system 106. For example, the interface may be used to access various applications in the computer system 106.

The computer system 106 may be communicatively coupled to one or more data sources 150. Data sources may be, for example, any database (e.g., relational database, in-memory database, etc.), an entity (e.g., set of related records), or data sets or data files included in a database. Alternatively, the database may be stored in a memory device of computer system 106.

It should be appreciated that the different components and sub-components of the computer system 106 may be located on different machines or systems. It should further be appreciated that the components of the client devices 160 may also be located on the computer system 106, or vice versa.

Computer system 106 includes a processor device or central processing unit (CPU) 114, an input/output (I/O) unit 110, and a memory module 112. Other support circuits, such as a cache, a power supply, clock circuits and a communications bus, may also be included in computer system 106. In addition, any of the foregoing may be supplemented by, or incorporated in, application-specific integrated circuits. Examples of computer system 106 include a smart device (e.g., smart phone), a handheld device, a mobile device, a personal digital assistance (PDA), a workstation, a server, a portable laptop computer, another portable device, a mini-computer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various programs, such as dynamic route planning system 120 for implementing the techniques described herein, all of which may be processed by processor device 114. As such, the computer system 106 is a general-purpose computer system that becomes a specific purpose computer system when executing the machine-executable instructions. Alternatively, the various techniques described herein may be implemented as part of a software product. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

Figure 2:
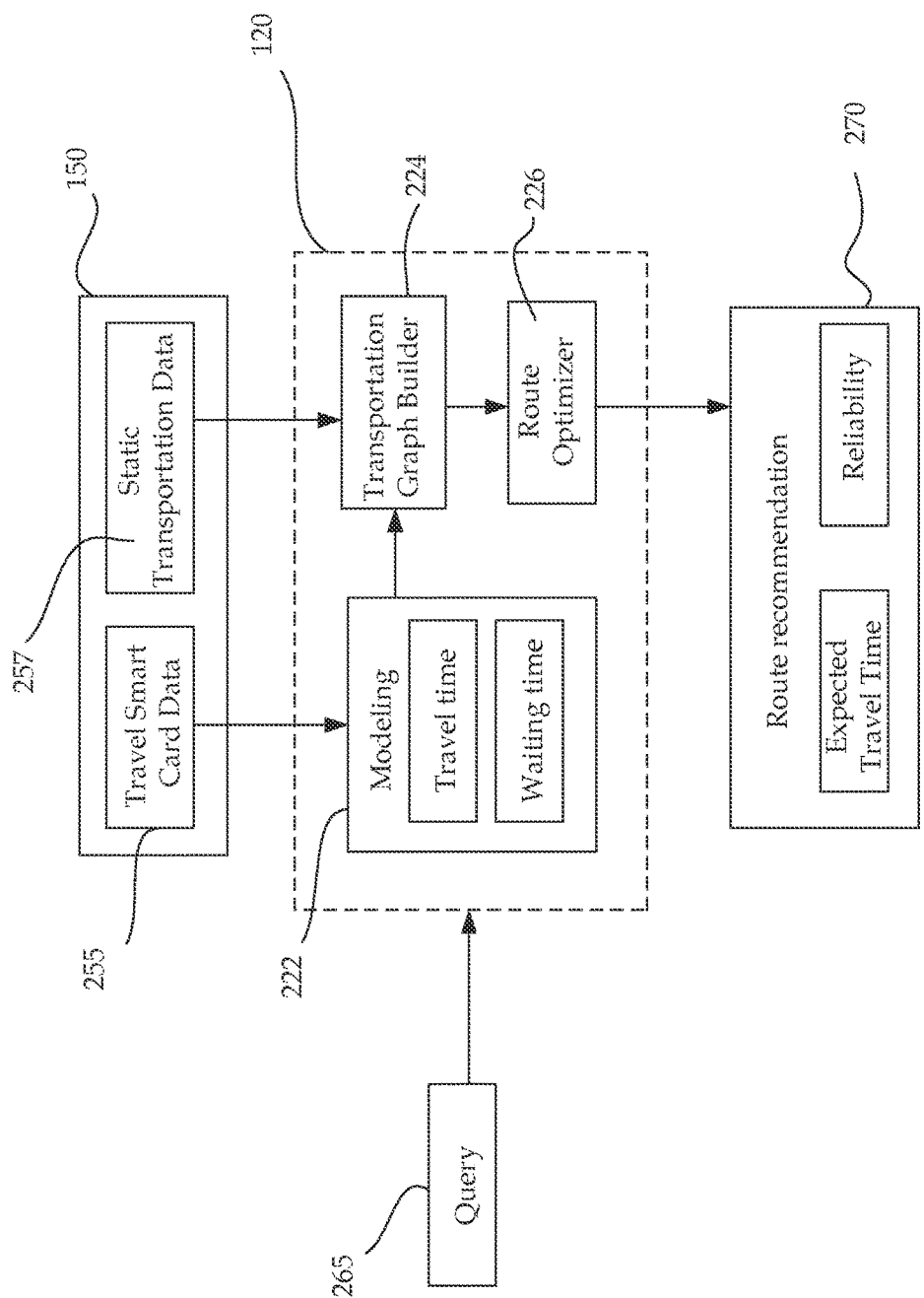
FIG. 2 shows an exemplary architecture of a route planning system.

FIG. 2 shows an exemplary architecture of the route planning system 120 in greater detail. The route planning system 120 includes a modeling module 222, a graph builder module 224 and a route optimizer module 226. Providing other modules for the route planning system may also be useful. It should be appreciated that the present framework is described in the context of a public bus network for the purposes of illustration only. The present framework may also be applied to other forms of public transportation networks.

As shown, the route planning system 120 collects data from the data source 150. The data source contains data or information used by the route planning system. The data source includes dynamic and static data sources. In some implementations, the dynamic data source includes travel smart card data 255 of commuters provided, for example, by a transportation service provider. The travel smart card data includes historical travel data of commuters of a public transportation system. For example, the collected data includes the recorded usage of bus lines of a public bus network. Each commuter's travel data may be added to the data set as they complete their trip. The travel data may be collected in real time. Alternatively, the data may be collected on a periodic basis. Collecting or providing the travel smart card data in other configurations may also be useful.

The collected data set may include rows containing recorded trips of commuters. For example, each row may be a recorded trip of a commuter. The trip starts when the smart card is tapped in the vehicle and ends when the passenger taps out. The format of a trip record, for example, is as follows: [Bus Line, Start Station, End Station, Boarding Time, Alighting Time, Trip Distance, Trip Date]. Providing other types of dynamic data may also be useful.

As for the static data source, it may include static transportation data 257 containing information of the transportation system. The static transportation data includes, for example, bus stop information, routing and static schedules of different bus service lines of a public bus system. Providing other static data for the route planning system may also be useful.

In one implementation, the modeling module 222 estimates the bus travel time and waiting time based on information extracted from the collected travel smart card data. The modeling module 222 extracts from the travel smart card data the estimated travel time and its variance between any two stops of a bus line during each time interval of a day. A number of time intervals are predefined within a day. In some implementations, a number of time intervals are predefined for both weekday and weekend. The number of time intervals may be predefined differently for both weekday and weekend. In other implementations, the same number of time intervals may be predefined for both weekday and weekend. The time intervals of a day, for example, may be predefined by the system provider of the route planning system. Providing other time intervals may also be useful. For example, the system provider may configure the time intervals of a day as desired.

The modeling module 222 takes every record of the data set as a sample point. Information such as boarding and alighting stops, boarding time, alighting time and total travel time for each trip may be determined from the record. The estimated travel time, for example, includes the boarding and alighting time of passengers in intermediate stops between any two boarding and alighting stops (i.e., origin and destination stops). In some implementations, the modeling module 222 groups all records according to the start stop, alighting stop, time interval and bus line. In other words, each record or trip are aggregated based on the start stop, alighting stop, time interval and bus line which they fall into. Each trip may be placed in a unique time interval within a day, for example, based on the midpoint of that trip. The midpoint may be defined as the point in time that is in the middle between the start time and end time of the trip. Using information of all entries in a single group, the mean and standard deviation of the corresponding travel time between two stops for the time interval and bus line of that group may be extracted.

The modeling module 222 then generates stochastic models for the bus travel time and waiting time in the form of probability distributions. For each of the time intervals in a day, the modeling module generates the distributions for both bus travel time and waiting time. The generated distributions allows for modelling rush hour situations which slows down the buses, thus achieving a realistic congestion temporal profile.

In some implementations, the modeling module 222 incorporates FIFO property in the public transportation network by linearizing the travel time and waiting time step function distributions for each time interval in a day to generate a continuous distribution functions for the time intervals. The modeling module generates the continuous distributions of bus travel time and waiting time for the time intervals in a day.

As for the transportation graph builder module 224, it serves to construct a time-dependent transportation graph. The time-dependent transportation graph may be built based on information from the static transportation data 257 (e.g., bus stops, routes and schedules of bus lines) and the modeled travel time and waiting time from the modeling module 222. The graph builder module 224 derives estimated travel and waiting time from the continuous distributions and associates the derived values as costs of edges between nodes in the transportation graph.

As for the route optimizer module 226, it optimizes costs of routes in the transportation graph. In some implementations, the route optimizer module 226 applies a modified or adapted multi-criteria shortest path technique in the transportation graph which solves the component aggregation property of travel time. The multi-criteria shortest path technique is modified to invoke a subroutine that finds a correct cost without any aggregation error. The route optimizer module outputs the shortest routes and their expected costs using the modified multi-criteria shortest path technique. In one implementation, the expected costs provide the speediness (expected travel time) and reliability of the routes.

The route planning system 120 provides route recommendations 270 to the user via the client device. The route recommendations, in one implementation, include routes with the least expected travel time and highest reliability. Additionally, the route recommendations include candidate routes ranked based on input parameters in the user query 265.

Figure 3:
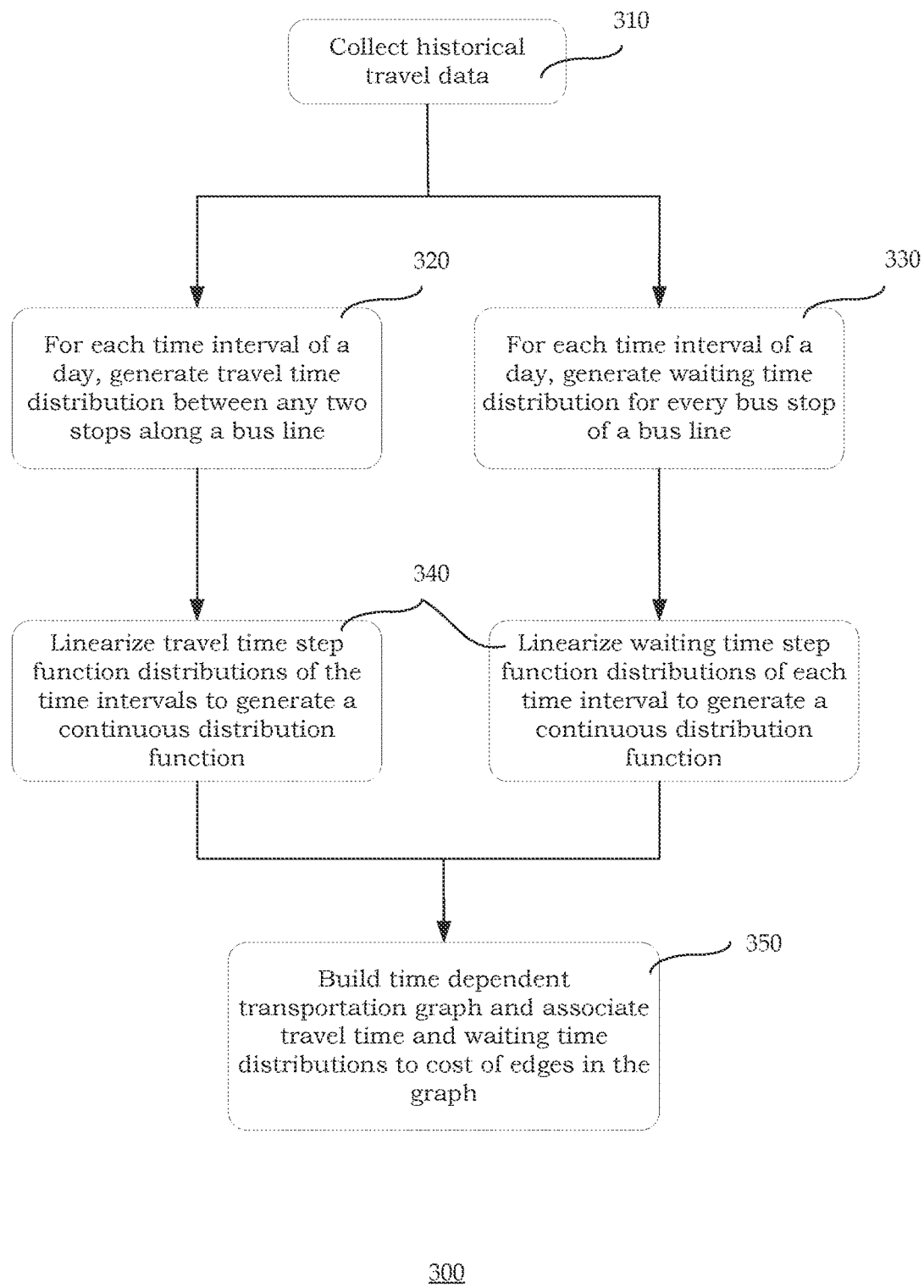
FIG. 3 shows an exemplary process for associating travel time and waiting time distributions to a time-dependent transportation graph.

FIG. 3 shows an exemplary process 300 for associating estimated travel time and waiting time to a time-dependent transportation graph. At 310, historical travel data of commuters of a public bus system is collected from travel smart card data of commuters. For example, the historical travel data from smart card data may be provided by a transportation service provider of the public bus network.

At 320, for each time interval of a day, the modeling module 222 generates the travel time distributions between any two stops along the same bus line.

In one implementation, the travel time of a bus from the i-th stop to the k-th stop during time interval j may be represented as a sample from a log normal distribution, which has the best Anderson-Darling goodness of fit tests on the data, as follows:

$$T_{i,k}^j \sim \text{Log } N(\mu_{i,k}^j, \sigma_{i,k}^j) \quad \text{Equation 1}$$

where $\mu_{i,k}^j$ is the mean of travel time between stop i and k in time interval j, $\sigma_{i,k}^j$ is the standard deviation of travel time between stop i and k in time interval j, and $T_{i,k}^j$ is the time for a bus to travel from the i-th stop to the k-th stop in time interval j.

The travel time distributions, $T_{i,k}^j$ between any two stops along the same bus line are generated by the modeling module for each time interval of a day. The modeling module generates the travel time distributions, $T_{i,k}^j$ for each bus line of the bus network.

The parameters needed for the distribution, i.e., the mean and the deviation, are extracted from the data set by finding all samples that have the same starting stop, ending or alighting stop, bus line and are within the respective time interval. The result of this process is a lookup table containing information about the distribution parameters of all possible stop to stop combinations for all time intervals of the day.

At 330, for each time interval of a day, the modeling module 222 generates the waiting time distribution for every bus stop of a bus line. The waiting time may be estimated by determining the frequency of bus arrivals of the same bus line at a given stop during a given time interval.

The modeling module 222 extracts the times $B_1^m$, which is the time when bus m is at the first stop in its scheduled route. The variable m denotes an instance or real bus servicing a particular bus line. In order to obtain the estimated arrival time of the bus at other stops, k, the mean travel time is added to $B_1^m$ as follows:

$$B_k^m = B_1^m + \mu_{1,k}^j \quad \text{Equation 2}$$

where $B_k^m$ denotes the estimated arrival time of bus m at stop k.

In order to estimate the frequency of buses arriving at a stop during a specific time interval j, a function $f$ is defined to determine if the estimated arrival time of a bus is within the chosen time interval. The function $f$ may be defined as follows:

$$f(B_i^m, j) = 1 \text{ if } B_i^m \in j \quad \text{Equation 3}$$

$$f(B_i^m, j) = 0 \text{ if } B_i^m \notin j \quad \text{Equation 4}$$

where $B_i^m$ is the time when bus m is at stop i.

The frequency of bus arrivals at a stop may be defined as the number of buses that are expected to arrive during a period divided by the length of the time interval as follows:

$$f_i^j = \frac{\sum_{m=1}^{M} f(B_i^m, j)}{R_l} \quad \text{Equation 5}$$

where
M is the number of buses of a particular bus line for the whole day,
R is the number of time intervals the day is split into,
$R_l$ is the length of a time interval, and
$f^j$ is the frequency of buses during time interval j.

The expected waiting time at a bus stop for a specific time interval may be calculated as follows:

$$w_i^j = \frac{1}{2 f_i^j} \quad \text{Equation 6}$$

where $w_i^j$ is the expected waiting time at the i-th stop during the j-th time interval. The waiting time distribution, $w_i^j$ is generated for each time interval of a day for every stop of a bus line.

At 340, the modeling module 222 linearizes the travel time and waiting time step function distributions for the time intervals in a day to generate a continuous distribution functions for both travel time and waiting time.

Figure 4:
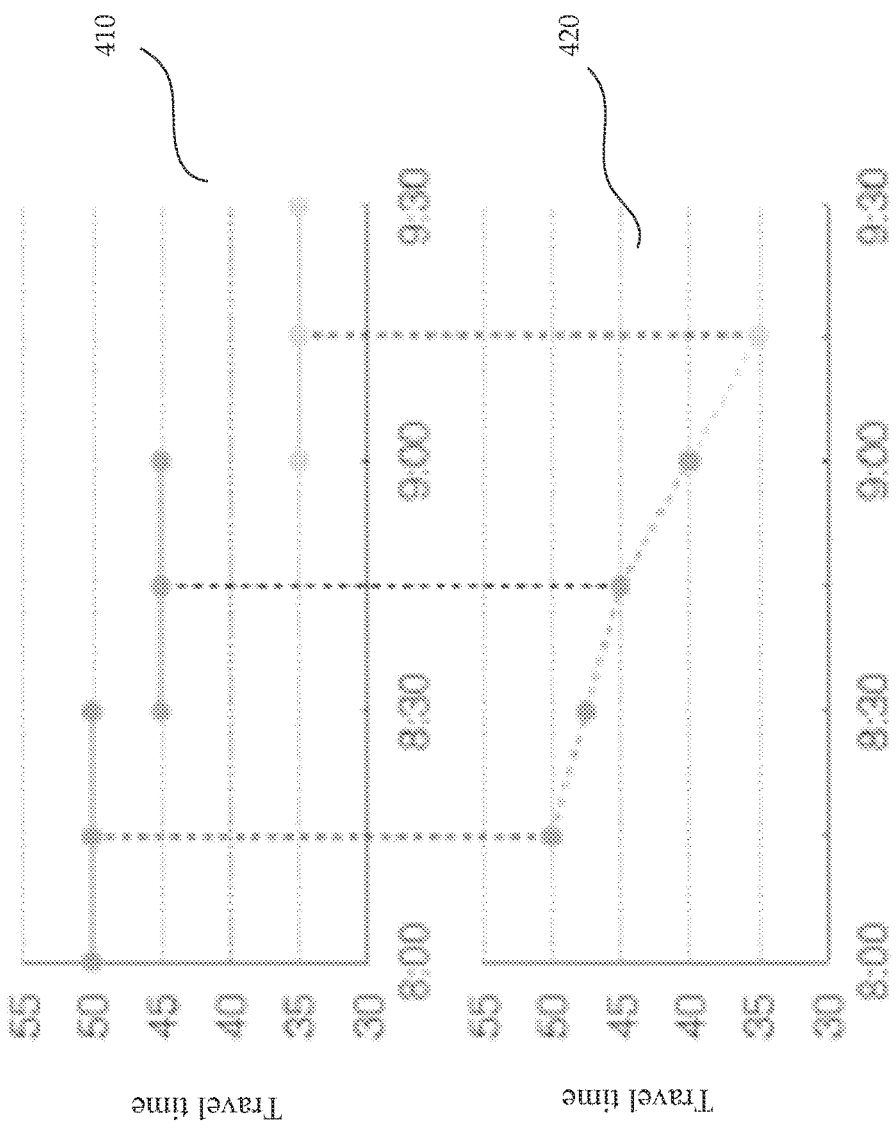
FIG. 4 shows an exemplary graph illustrating travel time step functions for time intervals in a portion of day and linearizing of the step functions.

FIG. 4 shows an exemplary graph 410 illustrating travel time step functions for time intervals in a portion of day and linearizing of the step functions. As illustrated in the travel time step functions in graph 410, the mean travel time between time interval [9:00, 9:30] is 35 minutes, while traveling between [8:30, 9:00], which is in peak hours, takes up to 45 minutes. If two users U1 and U2 start their journeys at 8:59 and 9:01 respectively, their expected travel times would be 45 and 35 minutes. The travel time estimation is not logical as with only two-minute difference in departure time, the expected travel time difference is as much as 10 minutes. Additionally, in this scenario, the FIFO property of a transit network is violated, i.e., user U1 starts earlier but ends up arriving later than user U2.

The linearization of the step functions of time-dependent travel time to continuous distributions of travel time may be implemented in accordance with a linearization technique. A linear function is created between any two neighboring time intervals. In this way, the travel time across time intervals during a day follows a continuous piece-wise linear function instead of step functions. Applying the linearization technique, graph 420 containing a continuous linear function may be derived from the step functions of graph 410. As illustrated, user U1 departing at 8:59 and user U2 departing at 9:01 are accordingly expected to travel 40.3 minutes and 39.7 minutes respectively, which follows the FIFO property.

Linearizing the step functions of time-dependent travel time to continuous distribution function ensures a FIFO property in the model. Specifically, instead of choosing the best matching time interval that a given departure time falls into, the best matching and the second best matching intervals is taken, and their weighted average is used as the expected travel time.

After linearizing the step functions of travel time, the FIFO property is guaranteed by the route planning system as long as the slope of the linear function is greater than −1, which intuitively means that by departing t units of time later, the expected travel time shortened should not be larger than t. Thus, departing later results in arriving at the destination at a later time.

Additionally, it should be noted that a network without FIFO property may not have optimal substructures. For example, the concatenation of the shortest paths from A to B and from B to C is not necessarily the shortest path from A to C. Typically, there is no optimal substructure in a general stochastic time-dependent network. Unlike existing route planners, the optimal substructures of shortest paths hold for linearized log normal continuous distribution functions when the FIFO property is guaranteed. Results from Monte Carlo experiments which were conducted confirm this. Accordingly, the present framework advantageously allows for optimal substructures in stochastic time-dependent public transit networks.

FIG. 5 shows an exemplary pseudo code of a linearization technique to linearize the travel time step functions of the time intervals in a day. The departure time t is provided to Algorithm 1 as illustrated in FIG. 5. The technique checks the position of the given time point. If it falls into the first or last time interval of a day, the result is only related to that single interval. Otherwise, the value is calculated based on the interval and its neighboring one. Providing other linearization techniques may also be useful.

Returning to FIG. 3, the steps 320-340 are performed for every bus line of the public bus network. At 350, the transportation graph builder module builds the time dependent transportation graph and associates estimated travel time and waiting time derived from the travel time and waiting time distributions as the cost of the edges in the graph.

As there can be multiple bus lines serving the same bus stop, different types of nodes are defined in the transportation graph. In one implementation, two types of nodes: (1) transfer nodes, t and (2) route nodes, r are used. For example, a physical bus stop S corresponds to a single transfer node $t_S$ and multiple route nodes, $r_S^{l_1}, \ldots, r_S^{l_k}$, where $l_k$ denotes a particular bus line and k denotes the total number of bus lines serving the bus stop. Assigning route nodes $r^l$ to a bus line for every bus stop that it services is performed for every bus line of the bus network. A route returned to users always starts from an origin transfer node and ends at a destination transfer node. Providing other types of nodes and number of types of nodes may also be useful.

The nodes of the graph may be interconnected by edges. In one implementation, the graph builder module defines three categories of edges in the transportation graph. Each category may be associated with a type of cost. For example, the edge from a transfer node $t_i$ to a route node $r_i^l$ represents a bus boarding process, and its associated cost is the expected waiting time $w_i^l$ at bus stop i of bus line l. The edge from a route node $r_i^l$ to a transfer node $t_i$ represents the alighting process of a commuter and its associated time cost may be assumed to be 0. The edge from a route node $r_i^l$ to another route node $r_j^l$ of the same bus represents the bus traveling process, and its associated cost is the estimated travel time $T_{i,j}^l$ between stops i and j of bus line l.

Figure 6:
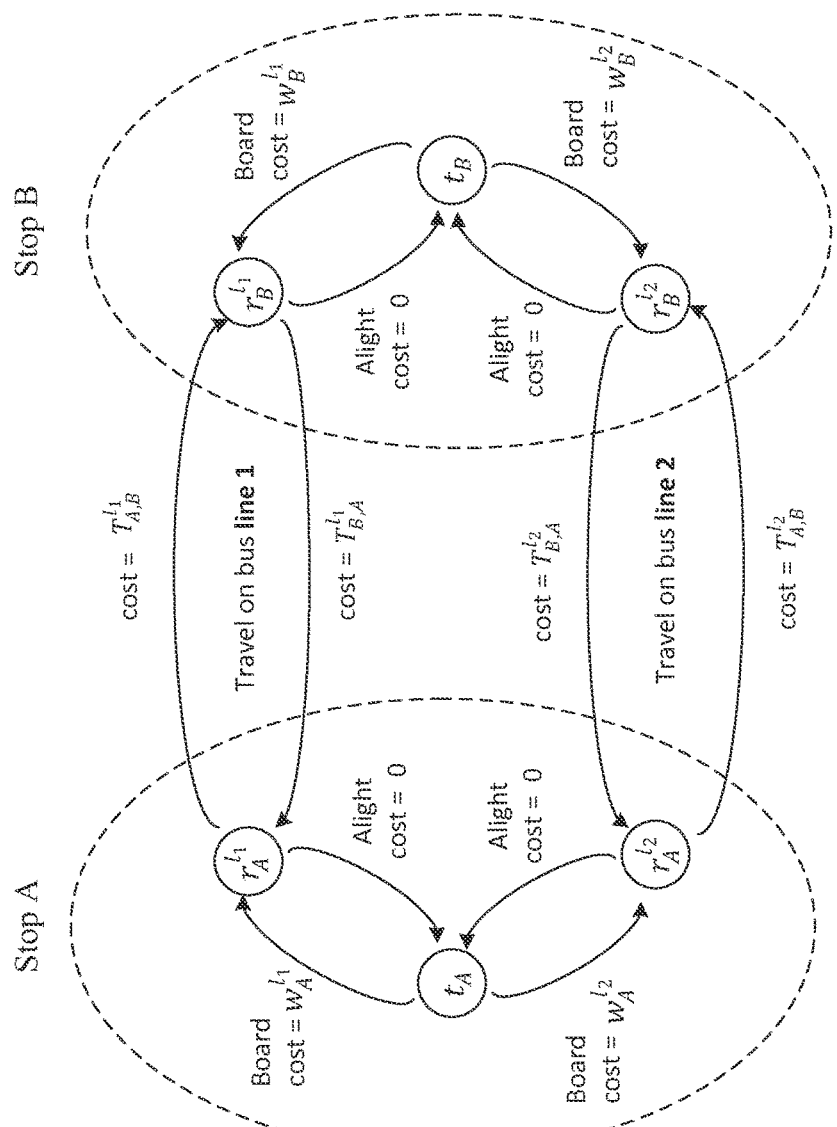
FIG. 6 illustrates a simplified exemplary time-dependent transportation graph.

FIG. 6 illustrates a simplified exemplary time-dependent transportation graph, where two bus lines $l_1$ and $l_2$ run between bus stops A and B. In this case, a stop (e.g., A) is modeled as a single transfer node (e.g., $t_A$) with two route nodes for the two bus lines $l_1$ and $l_2$ that service the stop (e.g., $r_A^{l_1}$ and $r_A^{l_2}$). The edge from transfer node A $t_A$ to route node A of bus line 1 $r_A^{l_1}$ represents a boarding process, and the associated cost of the edge is the expected waiting time for bus line $l_1$. The reversed edge, i.e., from route node A of bus line 1 $r_A^{l_1}$ to transfer node A $t_A$ means an alighting process and the cost is 0. The edge from route node A of bus line 1 $r_A^{l_1}$ to route node B of bus line 1 $r_B^{l_1}$ shows the traveling of bus line $l_1$ from bus stop A to B, and its associated cost is the expected travel time between the two stops.

It should be noted that the cost can be multi-dimensional. For example, in the stochastic model of the present framework, both bus waiting time and travel time have two dimensions. In one implementation, the two dimensions may be a mean and variance of travel time. The mean may be used to determine speediness (expected travel time) while the variance may be used to determine reliability of routes. In some implementations, a k-dimension cost c may be defined as an array of k cost elements $c[0]; c[1]; \ldots; c[k-1]$. A plus operation, $c=c_1+c_2$, may be defined as $c[i]=[i]+c_2[i] \forall_i \in [0, k-1]$, where i is the index referring to each element in the cost. A compare operation, $c_1 < c_2$, may be defined to be $c_1[i] \leq c_2[i] \forall_i \in [0, k-1]$ and $\exists m$, so that $c_1[m] < c_2[m]$. When combining two log normal distributions of travel times, the aggregate mean can be calculated by the sum of individual means. However, the aggregate variance typically requires solving a convolutional integral, which is highly computationally expensive. Thus, the sum of variances is used as an approximate indication for the reliability of routes.

Figure 7:
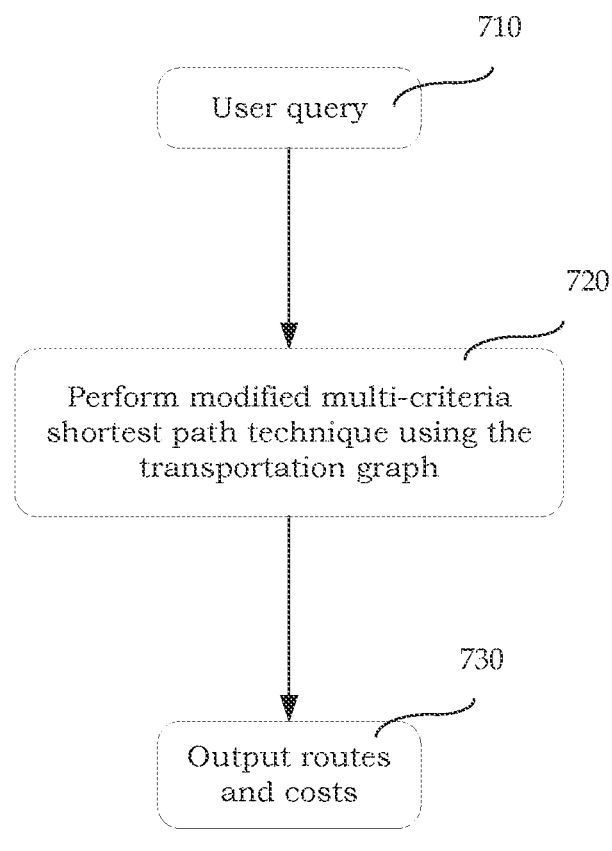
FIG. 7 shows an exemplary process for optimizing recommendation of routes in response to receiving user query.

FIG. 7 shows an exemplary process 700 for optimizing recommendation of routes in response to receiving user query. At 710, the route planning system receives a route query from a user. For example, a user may submit a query for a route recommendation via the client device. The query may include input parameters such as origin, destination and departure time.

At 720, the route optimizer module performs the modified multi-criteria shortest path technique using the transportation graph to determine candidate routes and their expected costs based on the input parameters in the user query. The modified multi-criteria shortest path technique determines costs of the candidate routes and outputs routes for recommendation. The costs may be multi-dimensional. For example, the multi-dimensional costs include means and variance of travel time. The total cost of a route may be computed as the summation of the costs of edges included in that route. In one implementation, the modified multi-criteria shortest path technique internally invokes a subroutine that calculates the accurate cost of a route to solve component aggregation error. At 730, candidate routes and their expected costs are returned to the user. The costs of the routes provide information of the expected waiting time and reliability of the routes. A route recommendation is provided to the user via the client device. The route recommendation, for example, may be candidate routes with the least expected travel time and highest reliability.

FIG. 8 illustrates an exemplary pseudo code of the modified multi-criteria shortest path technique (Algorithm 2) for generating candidate routes (or paths) and their expected costs. As the routine is invoked, input information including the source (origin) node $n_s$, destination node $n_d$, and departure time t are provided from the input parameter in a user query. The routines performs an initialization of a node label $l_i$, a priority queue pq, a predecessor map pm and a node cost list cl. The node label $l_i$ is defined as a pair structure $(n_i, c_i)$ which includes a node $n_i$ and its associated cost $c_i$. The cost $c_i$ may be a multi-dimensional cost to reach node $n_i$ from a source node $n_s$. The priority queue pq is maintained to determine which node and label to explore next. The priority queue is sorted based on the mean travel time of the multi-dimensional cost. The priority queue ensures that a node label which currently has the best preferences or lowest costs (e.g., means and variance of travel time) are on top of the queue so that they can be selected for consideration first.

A predecessor map pm is a map of the data structure and used to keep track of the predecessors of the labels. The pm tracks the predecessor of a current node label under analysis. For every node, there is a node cost list cl storing all non-dominated costs since a cost may not be strictly comparable to another. For example, based on the compare operation, if $c_1 < c_2$ is false, $c_1$ does not dominate $c_2$. If $c_1 < c_2$ is true, $c_1$ dominates $C_2$.

As shown, a label $l_s$ is created for the source node, $n_s$ with a cost 0 and inserted into the priority queue. The routine then implements a main loop, which keeps running until there are no more labels for analysis in the priority queue.

In each iteration of the main loop, the label with the lowest cost is retrieved and all of its outgoing edges are examined. The routine takes the first node (e.g., current node $n_u$) from the priority queue. The directed edge from current node $n_u$ to each neighboring node $n_v$ may be represented as the outgoing edge $e_{u,v}$. All outgoing edges $e_{u,v}$ of the current node $n_u$ to its neighboring nodes $n_u$ is examined, one by one, to obtain cost $c_v$ for each outgoing edge from $n_u$.

In the modified algorithm, instead of simply adding the current cost and the edge cost as in a typical multi-criteria shortest path technique which causes the aggregation error of bus travel time, a subroutine to retrieve accurate cost is invoked to find the accurate cost so as to reduce any aggregation error. For each outgoing edge $e_{u,v}$ of the current node $n_u$, the subroutine to obtain accurate cost is implemented to return accurate cost $c_v$ for the each neighboring node $n_v$ of the current node $n_u$ that is being analyzed. The subroutine will be described in detail with respect to FIG. 9.

Each returned cost $c_v$ of an outgoing edge is compared with the existing costs of the node $n_v$. Each time a new cost $c_v$ is found for a node $n_v$, a dominance analysis is performed where it is compared to other previously found costs of the same node $n_v$. The comparison is performed to determine if the cost $c_v$ of the node $n_v$ is dominated by the existing candidate costs. If a cost $c_i$, is not dominated by any costs, the cost $c_v$ is added as a candidate cost while the neighboring node $n_v$ is inserted into the priority queue. If the cost $c_v$ is not dominated by any existing costs, the neighboring node $n_v$ and cost $c_v$ is inserted into cl, while the dominated costs are removed from cl, a new label $l_v$ for the neighboring node $n_v$ is created, the pm is updated with the label $l_v$ and label $l_u$, the label $l_v$ is inserted into the priority queue. The algorithm stops when all labels are processed and the queue becomes empty.

FIG. 9 shows an exemplary subroutine to retrieve accurate cost (Algorithm 3 getAccurateCost) which may be invoked to obtain the accurate cost between nodes. In one implementation, the aggregation error may be assumed to happen only when a query is between two route nodes, not for transfer nodes. The input label $l_u$, edge $e_{u,v}$ and departure time t is provided as the subroutine is invoked. Implementation of lines 3-7 determines if the user query is made from a transfer node to a route node or the other way round. In both cases, taking the corresponding bus waiting time or cost 0 will do.

If is a current node $n_u$ is determined to be transfer node while a neighboring node $n_v$ is not, a boarding process is identified. The cost of the outgoing edge $e_{u,v}$, in the transportation graph is used to calculate the accurate cost $c_v$. In this case, the cost of the outgoing edge $e_{u,v}$, is the associated estimated waiting time in the transportation graph. As described, the estimated waiting time associated to the transportation graph is derived from the linearized waiting time distribution. The correct cost $c_v$ is calculated based on the cost $C_u$ of the current node $n_u$ being analyzed and the waiting time from node $n_u$ to node $n_v$.

If is a neighboring node $n_v$ is determined to be transfer node while a current node $n_u$ is not, an alighting process is identified. The cost of the outgoing edge $e_{u,v}$ in the transportation graph is used to calculate the accurate cost $c_v$. In this case, the cost of the outgoing edge $e_{u,v}$ as described with respect to an alighting process is taken to be 0. The returned correct cost $c_v$ may be the cost $c_u$ of the current node $n_u$ being analyzed in the modified multi criteria algorithm.

If both the current node $n_u$ and neighboring node $n_v$ are not transfer nodes, the query is determined to be made between two route nodes. As shown in line 8, an additional step is performed to solve the lack of component aggregation property problem. The routine keeps tracing backwards for predecessors using the predecessor map function to find the last non-transfer node $n_w$. The path from this node $n_w$ to the neighbouring node $n_v$ includes all boarding and alighting information for the intermediate bus stops. The node $n_w$ is labeled as $l_w$ and its cost $c_w$ is then retrieved. Once the last non-transfer node $n_w$ is obtained, the correct cost $c_v$ is calculated based on the cost $c_w$ of last non-transfer node $n_w$ and the travel time from node $n_w$ to node $n_v$. The travel time from node $n_w$ to node $n_v$ may be determined based on the cost of the outgoing edge $e_{w,v}$ from the last non-transfer node $n_w$ to the neighboring node $n_v$. In this case, the cost of the outgoing edge $e_{w,v}$ is the associated estimated travel time in the transportation graph. As described, the estimated travel time associated to the transportation graph is derived from the linearized travel time distribution.

FIG. 10 shows an exemplary process for obtaining the accurate cost. At 810, label $l_u$ (containing cost $C_u$ and node $n_u$), edge $e_{u,v}$, and departure time t at source is provided. At step 820, the route optimizer determines whether node $n_u$ is a transfer node. If node $n_u$ is a transfer node, a boarding process is determined at 822 and the associated cost $c_v$ is calculated and returned. If node $n_u$ is not a transfer node, at step 830, the route optimizer determines whether node $n_v$ is a transfer node. If node $n_v$ is a transfer node, an alighting process is determined at 832 and the associated cost $c_v$ is calculated and returned. If node $n_v$ is also not a transfer node, at step 840, the route optimizer initialize the the last non-transfer node $n_w$ to be the node $n_u$. The route optimizer then traces backwards for predecessors and updates the non-transfer node $n_w$ at 850. At 860, the route optimizer determines whether the updated node $n_w$ is a transfer node. If the updated node $n_w$ is a transfer node, at 862, the associated cost $c_v$ is calculated and returned. If the updated node $n_w$ is not a transfer node, the route optimizer iteratively loops backs to step 850 until it finds a predecessor which is a transfer node.

Figure 11:
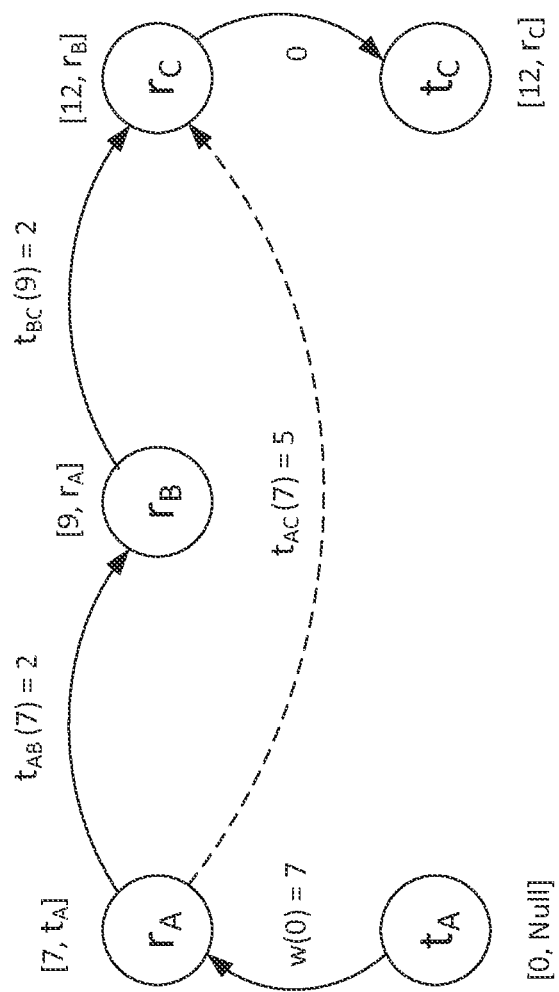
FIG. 11 illustrates a simplified exemplary process to obtain the accurate cost using in the transportation graph.

FIG. 11 illustrates a simplified exemplary process to obtain the accurate cost using the transportation graph to reduce aggregation time error. A bus serves three subsequent stops A, B and C denoted by route nodes $r_A$, $r_B$, and $r_C$. The bus stop A may be the origin and the bus stop C may be the destination. At stop A the waiting time is a 7-minute waiting time. In a non-modified multi criteria technique, the travel time from stop A to stop B is calculated by simply adding travel time from stop A to stop B $T_{A,B}$ (2-minute travel time) to the waiting time. From stop B to stop C, a further travel time from stop B to stop C $T_{B,C}$ of 2-minute is simply added to obtain 11-minutes expected travel time. Using the modified multi criteria technique, starting from the transfer node $t_A$, only the sum of the cost of the edge $C_A$ from the transfer node $t_A$ to the route node $r_A$ (7-minute waiting time for a boarding process) and the travel time $T_{A,C}$ from the last non-transfer node $r_A$ to the first non-transfer node $r_C$ is calculated. In other words, the expected travel time is determined using $C_A+T_{A,C}$, which equals to 12 minutes. The resulting expected travel time is longer as the component aggregation property is taken into account.

Experiments were performed to evaluate the quality and accuracy of the routes returned by the dynamic route planning system. The data used for building stochastic models of bus travel time and waiting time are collected from real smart card integrated bus network in Singapore and includes the recorded usage of all bus lines in a period of three months. A trip by a commuter recorded in the data set starts when the smart card is used to tap in the vehicle and ends when the passenger taps out.

A simple statistics analysis was performed on the data to confirm the time-dependent characteristic of bus travel time. More specifically, the impact on travel time is measured when a journey by a commuter is performed during peak hours in weekdays compared to other times. Origin-destination (OD) pairs are randomly selected and the travel times of the same pair during different times are compared as follows: (1) during peak and off-peak hours in the same weekday, and (2) during the same peak hours of weekdays and weekends.

Table 1 shows the distribution of the ratio between the travel times during peak hours vs. off-peak hours in a weekday. More particularly, Table 1 shows the results of data compared on weekdays, (1) in the morning at 0815 vs at 0945, and (2) in the evening at 1815 vs 1615. O-D pairs are put into different bins based on the ratio, ranging from less than 1 (i.e., traveling during peak hours takes less time than non-peak hours, which are exception points in the data set) to greater than 1.4 (i.e., traveling during peak hours takes 1.4 times longer than non-peak hours). It can be seen that for more than 90% cases, the ratio is greater than 1 which means the travel time is typically longer during peak hours as expected. On average, 20% more time is spent due to traffic congestions during peak hours.

TABLE 1

| | Peak/Offpeak | | | | | |
|---|---|---|---|---|---|---|
| | <1 | 1~1.1 | 1.1~1.2 | 1.2~1.3 | 1.3~1.4 | >1.4 |
| AM | 9.7% | 13.7% | 20.3% | 26.3% | 16.6% | 13.5% |
| PM | 11.7% | 13.3% | 22.9% | 20.5% | 15.0% | 16.7% |

Table 2 shows that peak hours have greater impact on weekdays rather than weekends. More particularly, Table 2 shows the results of data compared in the morning at 0815 and in the evening at 1815 for weekdays vs weekends. As shown, the same journey generally takes 20% more time to complete during peak hours on weekdays as compared to weekends.

TABLE 2

| | Weekdays/Weekends | | | | | |
|---|---|---|---|---|---|---|
| | <1 | 1~1.1 | 1.1~1.2 | 1.2~1.3 | 1.3~1.4 | >1.4 |
| AM | 14.6% | 19.7% | 13.1% | 16.4% | 16.4% | 19.7% |
| PM | 8.9% | 10.1% | 16.6% | 25.5% | 19.4% | 19.4% |

Additionally, the dynamic route planning system is compared with Google Maps and Gothere.sg, which are among the existing route planners in Singapore. The accuracy as well as the quality of the routes returned by these systems are the object of the experiment. More specifically, the following metrics are used in the evaluation: (1) the accuracy of the expected total travel time of trips departing at various times including weekdays' peak and off-peak hours and weekends, (2) the ability to dynamically rank candidate routes dependent on the departure times, and (3) the ability to consider both the speediness and the reliability of routes.

First, trip instances are randomly selected from the historical smart card data. Each selected trip includes the information of departure time, arrival time and an origin-destination (O-D) pair. Historical travel time $T_h$ can be calculated from the arrival and departure times. The route planners are then queried for the same O-D pair given the same departure time to get the travel time $T_c$ of the optimal route returned by the systems. Root-mean-square error (RMSE) is used to measure the accuracy of the returned travel times. Further, instead of using the absolute travel time difference $(T_c-T_h)$ which is difficult to interpret, percentage values calculated as $$\left(\frac{T_c - T_h}{T_h}\right)$$

are used.

Table 3 as follows shows the results of the experiment. More particularly, Table 3 shows the error of the estimated travel time based on the historical travel time. As shown, Gothere.sg suffers from the largest error. On average, its returned travel time is 40% different from the real value. Google Maps does relatively well for weekday off-peak hours and weekends when the error is just around 15%. However, its travel time estimation for peak hours drops sharply and the error is as high as 22%. In comparison, the accuracy of the present dynamic route planning system as discussed herein and denoted as DEPART in Table 3, is the best of the three in all cases. The error is constantly below 14% and usually below 10%. Additionally, the travel time estimation for peak hours achieves similar accuracy as off-peak hours. The results confirm that the DEPART route planning system can effectively deal with the uncertain and time-dependent characteristics of urban traffic. The dynamic route planning system advantageously provides higher accuracy in the expected total travel time.

TABLE 3

| | AM peak | PM peak | AM off-peak | PM off-peak | Weekend |
|---|---|---|---|---|---|
| DEPART | 13.8% | 10.8% | 9.7% | 9.3% | 4.8% |
| Google Maps | 22.2% | 23.2% | 13.7% | 10.5% | 14.2% |
| Gothere.sg | 45.5% | 46.7% | 40.4% | 29.0% | 40.6% |

Next, existing route planners such as Google Maps and Gothere.sg are static in that they return the same routes regardless of different departure times. In contrast, the present dynamic route planning system recommends routes with better quality due to its ability to calculate routes that are more adapted to traffic conditions such as, for example, during peak and off-peak hours.

Figure 12:
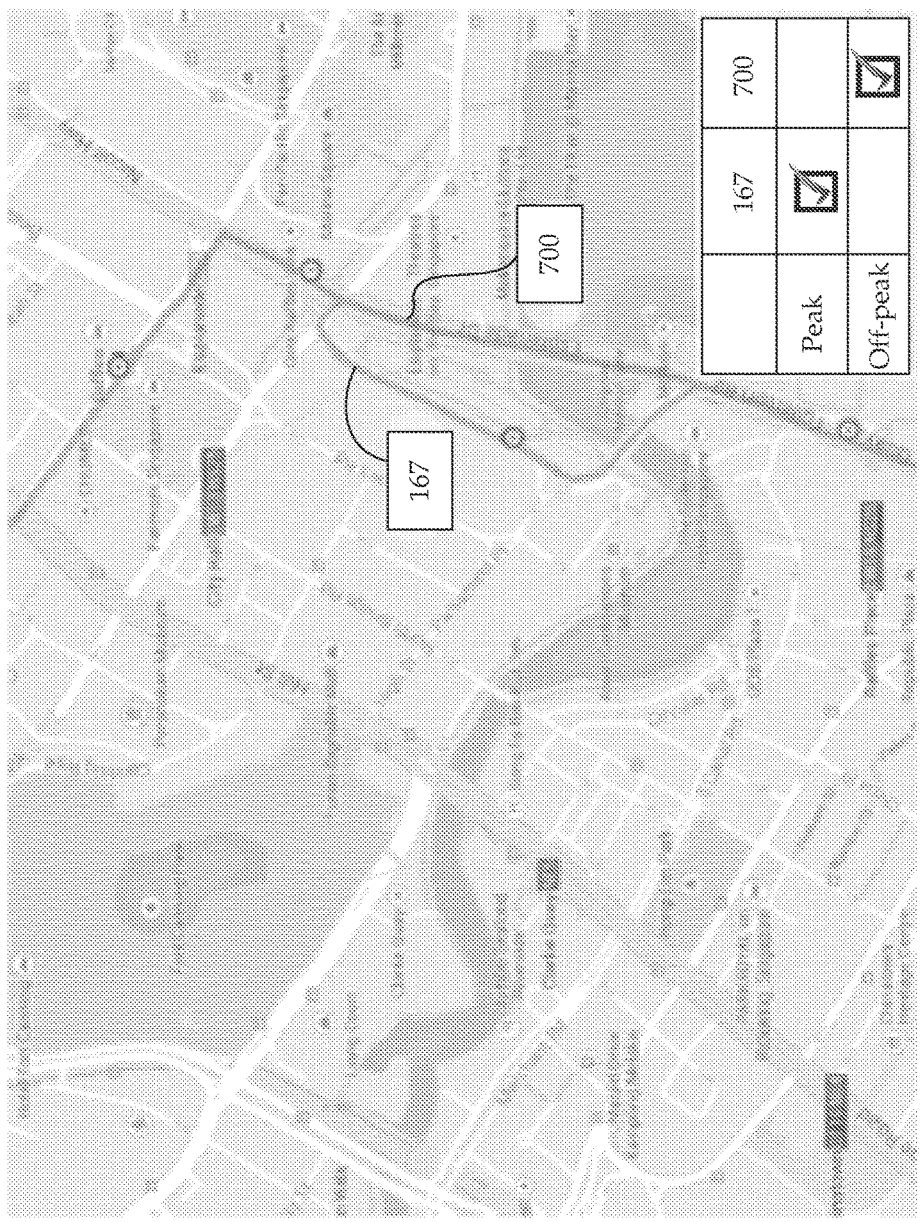
FIG. 12 shows two exemplary routes on a map of a particular geographical area and route recommendation by the route planning system.

FIG. 12 shows two exemplary routes on a map of a particular geographical area and route recommendation by the route planning system. Bus 700 goes by the right path which is the main road while bus 167 goes by a side track path on the left. When traveling from bus stop 03223 to stop 08031 at 1430 on a weekday, both routes take less than 15 minutes and bus 700 is slightly faster. Thus, the dynamic route planning system recommends bus 700 traveling by the main road. When the departure time is 1830, the expected travel times of bus 700 and bus 167 increases to 22 and 18 minutes respectively. This means that the previously faster route 700 on the main road turns out to be more congested and takes 20% longer travel time. In this case, the route planning system dynamically recommends bus 167 to the user. The dynamic route planning system advantageously allows for dynamic ranking of candidate routes based on departure times in the user query.

Figure 13:
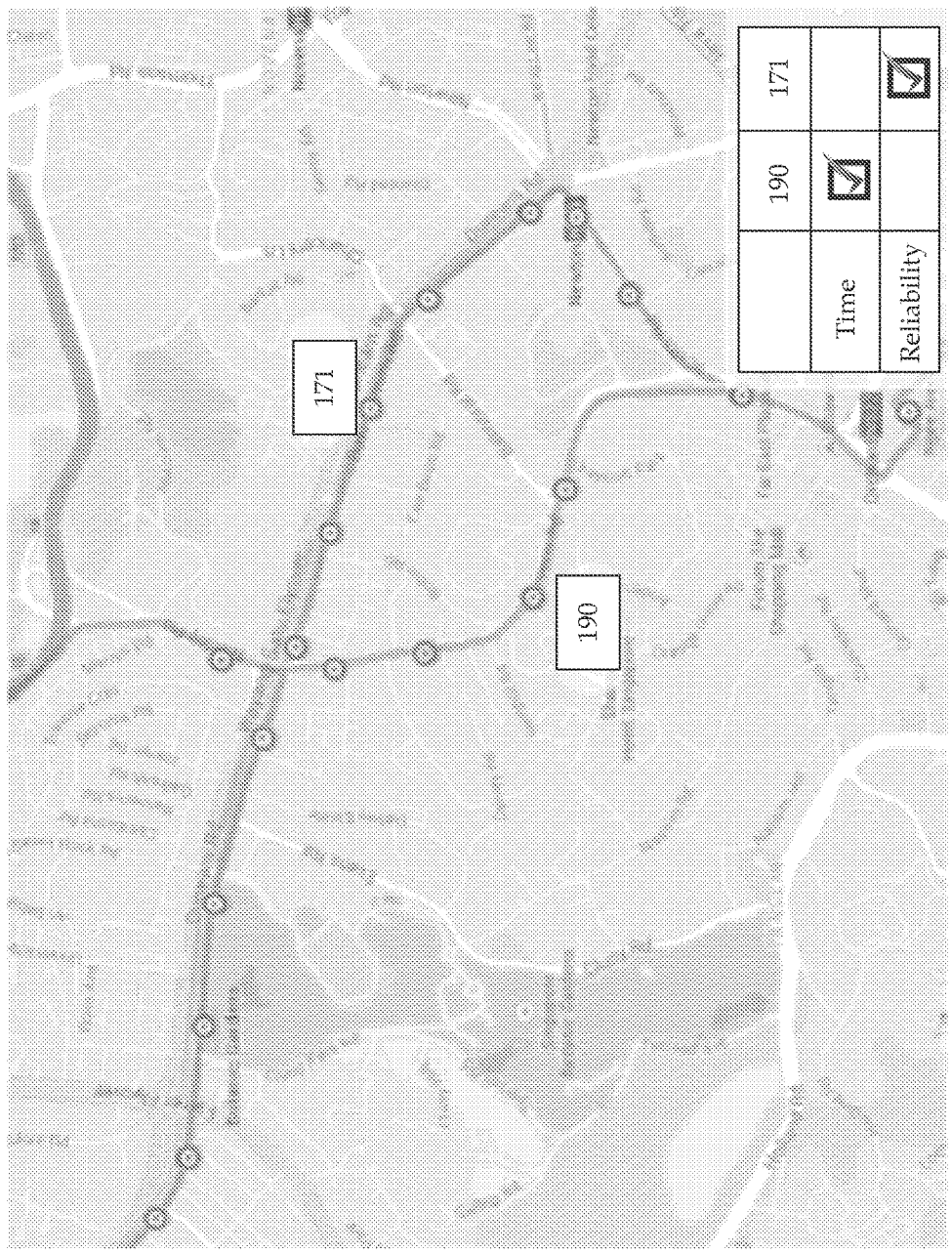
FIG. 13 illustrates an exemplary implementation of the route planning system in considering the reliability of paths.

Further, as the traffic network is stochastic in nature, the expected travel time is not always reliable. To optimize both the speediness and reliability of routes, the route planning system utilizes the modified multi-criteria technique and finds both least expected travel time and most reliable routes. FIG. 13 illustrates an exemplary implementation of the route planning system in considering the reliability of paths. More particularly, the system compares the speediness and the reliability of different routes to recommend a particular route based on the users preference.

Two routes, for example, from downtown to a fencing club fencing club is shown. Historical data shows that during evening peak hours the upper route going through the main road takes 15% longer travel time than the lower route, but its variance is only 20% of the faster one. Both routes are returned by the route planning system since they are better in either the expected travel time or reliability. In the case where a user has a fencing class to attend and does not want to miss it by any chance, he or she may take the slightly longer but more reliable route. Other users without strict deadlines may choose the expected faster route.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A route planning system, comprising:
a non-transitory memory device for storing computer readable program code; and
a processor device in communication with the memory device, the processor device being operative with the computer readable program code to perform steps including
providing historical travel data of commuters of a transportation network;
for a number of time intervals in a day, generating travel time and waiting time distributions from the travel data;
generating continuous distributions of travel time and waiting time by linearizing the travel time and waiting time distributions for the time intervals;
associating the travel time and waiting time continuous distributions to a transportation graph of the transportation network, the transportation graph comprises nodes corresponding to stops of the transportation network and edges interconnecting the nodes, wherein estimated travel time and waiting time derived from the continuous distributions are associated as costs of the edges in the transportation graph;
in response to receiving input parameters, determining expected costs of candidate routes in the transportation graph in accordance with a modified multi criteria shortest path technique, wherein the modified multi criteria shortest path technique invokes a subroutine to retrieve accurate costs of routes based at least on the costs of the edges in the transportation graph; and
outputting route recommendation based on the expected costs of the candidate routes.

2. The system of claim 1 wherein the processor device is operative with the computer readable program code to generate the transportation graph based on static transport data.

3. The system of claim 1 wherein:
the nodes of the transportation graph comprises two types of nodes, the two types of nodes includes a transfer node and a route node, wherein a stop S of the transportation network corresponds to a single transfer node $t_S$ and multiple route nodes $r_S^{l_1}, \ldots, r_S^{l_k}$, where $l_k$ denotes a transport service line and k denotes the total number of transport service lines serving the stop; and
the edges of the transportation graph comprises three types of edges, wherein a first type of edge is from a transfer node to a route node which corresponds to a boarding process,
a second type of edge is from a route node to a transfer node which corresponds to an alighting process, and
a third type of edge is from a route node to another route node which corresponds to a traveling process.

4. The system of claim 3 wherein:
the cost of the first type of edge corresponding to the boarding process is associated with the estimated waiting time;
the cost of the second type of edge corresponding to the alighting process is 0; and
the cost of the third type of edge corresponding to the traveling process is associated with the estimated travel time.

5. The system of claim 4 wherein the processor device is operative with the computer readable program code to:
receive input parameters from a user query on a user device, wherein the input parameters include a source node $n_s$, a destination node lid and a departure time t;
the modified multi criteria shortest path technique determines the candidate routes by identifying one or more nodes and costs to reach the one or more nodes from the source node $n_s$, and selecting a node $n_u$ with the lowest cost.

6. The system of claim 5 wherein the associated costs of the edges in the transportation graph comprises means and variance of travel time.

7. The system of claim 5 wherein selecting the node $n_u$ further comprises analysing the node $n_u$ by
invoking the subroutine to retrieve the accurate costs of each outgoing edges from the node $n_u$ to neighbouring nodes $n_v$; and
performing a dominance analysis on the returned accurate costs for each of the neighbouring nodes $n_v$.

8. The system of claim 7 wherein the subroutine retrieves the accurate costs of the outgoing edges by:
determining whether one of the current node $n_u$ being analyzed and a neighbouring node $n_v$ is a transfer node;
in response to determining the node $n_u$ is a transfer node and a neighbouring node $n_v$ is a route node, identifying a boarding process, and calculating an accurate cost $c_v$ based at least on a waiting time associated to the outgoing edge from the node $n_u$ to the neighbouring node $n_v$.

9. The system of claim 7 wherein the subroutine retrieves the accurate costs of the outgoing edges by:
determining whether one of the current node $n_u$ being analyzed and a neighbouring node $n_v$ is a transfer node;
in response to determining that the current node $n_u$ being analyzed and a neighbouring node $n_v$ are not transfer nodes; iteratively tracing back to find a last non-transfer node; and
calculating an accurate cost $c_v$ based at least on a travel time associated to the outgoing edge from the last non-transfer node to the neighbouring node $n_v$.

10. A computer-implemented method for planning routes of a transportation network comprising:
providing travel data of commuters of a transportation network;
generating continuous distributions of travel time and waiting time from the travel data;
associating the continuous distributions of travel time and waiting time to a transportation graph of the transportation network, the transportation graph comprises nodes corresponding to stops of the transportation network and edges interconnecting the nodes, wherein travel time and waiting time are associated as costs of the edges in the transportation graph;
in response to receiving input parameters, determining expected costs of candidate routes in the transportation graph in accordance with a modified multi criteria shortest path technique, wherein the modified multi criteria shortest path technique invokes a subroutine to retrieve accurate costs of routes based at least on the costs of the edges in the transportation graph; and providing route recommendation based on the expected costs of the candidate routes.

11. The method of claim 10 wherein the travel data comprises historical travel data of commuters of a public transportation system.

12. The method of claim 10 comprising:

receiving input parameters from a user query on a user device, wherein the input parameters include a source node $n_s$, a destination node lid and a departure time t;

the modified multi criteria shortest path technique determines the candidate routes by identifying one or more nodes and costs to reach the one or more nodes from the source node $n_s$, and selecting a node $n_u$ with the lowest cost.

13. The method of claim 12 wherein the associated costs of the edges in the transportation graph are multi-dimensional, wherein the multi-dimensional costs comprises means and variance of travel time;

the selected node $n_u$ with the lowest cost comprises one of lowest means and variance of travel time.

14. The method of claim 13 wherein analysing the node $n_u$ comprises:

invoking the subroutine to retrieve the accurate costs of each outgoing edges from the node $n_u$ to neighbouring nodes $n_v$; and performing a dominance analysis on the returned accurate costs for each of the neighbouring nodes $n_v$.

15. The method of claim 13 wherein the transportation graph comprises:

transfer nodes corresponding to stops of the transportation network, wherein a transfer node corresponds to a single stop of the transportation network;

route nodes corresponding to transport service lines of the transportation network, wherein a route node of a transport service line is associated with a single transfer node;

a first edge from a transfer node to a route node which corresponds to a boarding process is associated with the waiting time;

a second edge from a route node to a transfer node which corresponds to an alighting process is associated with a 0 cost; and a third edge from a route node to another route node which corresponds to a traveling process is associated with the travel time.

16. The method of claim 15 wherein the subroutine retrieves the accurate costs of the outgoing edges by:

determining whether one of the current node $n_u$ being analyzed and a neighbouring node $n_v$ is a transfer node;

in response to determining that the current node $n_u$ being analyzed and a neighbouring node $n_v$ are not transfer nodes, iteratively tracing back to find a last non-transfer node; and calculating an accurate cost $c_v$ based at least on a travel time associated to the outgoing edge from the last non-transfer node to the neighbouring node $n_v$.

17. A non-transitory computer readable medium embodying a program of instructions executable by machine to perform steps comprising:

providing travel data of commuters of a transportation network;

generating continuous distributions of travel time and waiting time from the travel data;

associating the continuous distributions of travel time and waiting time to a transportation graph of the transportation network, the transportation graph comprises nodes corresponding to stops of the transportation network and edges interconnecting the nodes, wherein travel time and waiting time are associated as costs of the edges in the transportation graph;

in response to receiving input parameters, determining expected costs of candidate routes in the transportation graph in accordance with a modified multi criteria shortest path technique, wherein the modified multi criteria shortest path technique invokes a subroutine to retrieve accurate costs of routes based at least on the costs of the edges in the transportation graph; and outputting route recommendation based on the expected costs of the candidate routes.

18. The computer readable medium of claim 17 wherein the transportation graph comprises:

transfer nodes corresponding to stops of the transportation network, wherein a transfer node corresponds to a single stop of the transportation network;

route nodes corresponding to transport service lines of the transportation network, wherein a route node of a transport service line is associated with a single transfer node;

a first edge from a transfer node to a route node which corresponds to a boarding process is associated with the waiting time;

a second edge from a route node to a transfer node which corresponds to an alighting process is associated with a 0 cost; and a third edge from a route node to another route node which corresponds to a traveling process is associated with the travel time.

19. The computer readable medium of claim 18 wherein the subroutine retrieves the accurate costs of the outgoing edges by:

determining whether one of the current node $n_u$ being analyzed and a neighbouring node $n_v$ is a transfer node;

in response to determining that the current node $n_u$ being analyzed and a neighbouring node $n_v$ are not transfer nodes, iteratively tracing back to find a last non-transfer node; and calculating an accurate cost $c_v$ based at least on a travel time associated to the outgoing edge from the last non-transfer node to the neighbouring node it $n_v$.

20. The computer readable medium of claim 18 wherein the subroutine retrieves the accurate costs of the outgoing edges by:

determining whether one of the current node $n_u$ being analyzed and a neighbouring node $n_v$ is a transfer node;

in response to determining the node $n_u$ is a transfer node and a neighbouring node $n_v$ is a route node, identifying a boarding process, and calculating an accurate cost $c_v$ based at least on a waiting time associated to the outgoing edge from the node $n_u$ to the neighbouring node $n_v$.

* * * * *